US011119840B2

(12) United States Patent
Shen et al.

(10) Patent No.: US 11,119,840 B2
(45) Date of Patent: Sep. 14, 2021

(54) TRACKING EVENTS OF INTEREST

(71) Applicant: Arm Limited, Cambridge (GB)

(72) Inventors: Asaf Shen, Irvine, CA (US); Subbayya Chowdary Yanamadala, Dallas, TX (US)

(73) Assignee: ARM LIMITED, Cambridge (GB)

( * ) Notice: Subject to any disclaimer, the term of this patent is extended or adjusted under 35 U.S.C. 154(b) by 191 days.

(21) Appl. No.: 16/409,314

(22) Filed: May 10, 2019

(65) Prior Publication Data
US 2020/0356434 A1 Nov. 12, 2020

(51) Int. Cl.
*G06F 11/07* (2006.01)
*G06F 11/14* (2006.01)
*G06F 1/30* (2006.01)

(52) U.S. Cl.
CPC .......... *G06F 11/0787* (2013.01); *G06F 1/30* (2013.01); *G06F 11/076* (2013.01); *G06F 11/0727* (2013.01); *G06F 11/1451* (2013.01); *G06F 2201/84* (2013.01)

(58) Field of Classification Search
CPC . G06F 11/076; G06F 11/0727; G06F 11/0787
See application file for complete search history.

(56) References Cited

U.S. PATENT DOCUMENTS

| 3,887,911 | A | 6/1975 | Bell |
| 3,989,034 | A | 11/1976 | Hojaiban |
| 4,066,964 | A | 1/1978 | Costanza et al. |
| 4,187,399 | A | 2/1980 | Maxfield et al. |
| 4,710,865 | A | 12/1987 | Higomura |
| 4,789,925 | A | 12/1988 | Lahti |
| 4,907,845 | A | 3/1990 | Wood |
| 5,148,171 | A | 9/1992 | Blumberg |
| 5,218,707 | A | 6/1993 | Little et al. |
| 5,996,081 | A | 11/1999 | Shim |
| 6,073,236 | A | 6/2000 | Kusakabe et al. |
| 6,289,455 | B1 * | 9/2001 | Kocher ................ G06Q 20/367 380/228 |

(Continued)

FOREIGN PATENT DOCUMENTS

EP 2009864 A1 12/2008
EP 3040901 A1 7/2016

OTHER PUBLICATIONS

Office Action Issued in U.S. Appl. No. 16/409,205, dated Dec. 24, 2020, 42 Pages.

(Continued)

*Primary Examiner* — Matthew M Kim
*Assistant Examiner* — Kurosu Risa Altaf
(74) *Attorney, Agent, or Firm* — Talem IP Law, LLP

(57) ABSTRACT

A system for tracking events of interest can include at least one volatile counter; a nonvolatile storage coupled to the at least one volatile counter, the nonvolatile storage storing a bit for each top volatile count number of events identified by the at least one volatile counter; a backup power source coupled to the at least one volatile counter; and readout circuitry and control logic coupled to the one or more of the at least one volatile counter and to the nonvolatile storage, the readout circuitry and control logic being configured to control operations of the at least one volatile counter during an error event and determine a total number of events.

19 Claims, 6 Drawing Sheets

(56) References Cited

U.S. PATENT DOCUMENTS

| | | | |
|---|---|---|---|
| 7,120,220 | B2 | 10/2006 | Du et al. |
| 7,421,552 | B2 * | 9/2008 | Long .................. G06F 11/1441 |
| | | | 711/103 |
| 8,559,576 | B2 | 10/2013 | Ono et al. |
| 8,762,656 | B2 * | 6/2014 | Confalonieri ...... G11C 13/0033 |
| | | | 711/154 |
| 9,454,424 | B2 | 9/2016 | Von Wendorff |
| 2010/0001777 | A1 | 1/2010 | Brantley et al. |
| 2010/0332851 | A1 | 12/2010 | Priel et al. |
| 2011/0085379 | A1 | 4/2011 | Kim |
| 2011/0145595 | A1 | 6/2011 | Kim et al. |
| 2012/0284533 | A1 | 11/2012 | Assche et al. |
| 2016/0371161 | A1 * | 12/2016 | Louie .................. G06F 3/0647 |
| 2017/0060681 | A1 | 3/2017 | Halbert et al. |
| 2017/0075812 | A1 * | 3/2017 | Wu ..................... G06F 12/0246 |
| 2017/0177262 | A1 * | 6/2017 | Sharma ................ G06F 3/0634 |
| 2019/0042739 | A1 | 2/2019 | Browne et al. |

OTHER PUBLICATIONS

"International Search Report and Written Opinion Issued in International Patent Application No. PCT/GB2019/051872", dated Aug. 6, 2019, 13 Pages.

Office Action Issued in U.S. Appl. No. 16/030,459, dated Sep. 11, 2020, 26 Pages.

Smart Card Alliance, "What Makes a Smart Card Secure?", A Smart Card Alliance Contactless and Mobile Payments Council White Paper, https://www.securetechalliance.org/publications-smart-card-security/, Published in Oct. 2008, 37 pages.

Final Office Action Issued in U.S. Appl. No. 16/030,459, dated Feb. 12, 2021, 35 Pages.

Non-Final Office Action issued in U.S. Appl. No. 16/030,459, dated Aug. 3, 2021, 42 pages.

* cited by examiner

TRACKING EVENTS OF INTEREST

BACKGROUND

Computing devices may include event tracking circuitry to keep a count of events of interest. One type of computing device that may incorporate event tracking circuitry is a smart card. Smart cards are portable, personal security computing devices that can securely carry sensitive information, enable secure transactions, validate an individual's identity within a secure system, and verify that an information requestor is authorized to access the information carried on the card. Smart cards are configured to maintain the integrity of the information stored on the card, as well as make the information available for secure interactions with an overall system.

BRIEF SUMMARY

Techniques for reliably storing count information efficiently in nonvolatile memory when power loss or other manipulation occurs are described herein. The described methods, techniques, and systems are suitable for maintaining the integrity of the count of certain events when tracking events of interest.

During the tracking operation, a loss of power may occur. This loss of power is referred to herein as an "error event." In some cases, the loss of power may be due to an adversarial action.

A system for tracking events can include at least one volatile counter; a nonvolatile storage coupled to the at least one volatile counter, the nonvolatile storage storing a bit for each top volatile count number of events identified by the at least one volatile counter; a backup power source coupled to the at least one volatile counter; and readout circuitry and control logic coupled to the one or more of the at least one volatile counter and to the nonvolatile storage, the readout circuitry and control logic being configured to control operations of the at least one volatile counter during an error event and determine a total number of events.

In one scenario, upon receiving the error event, the volatile counter is powered by a backup power source for a predetermined length of time. In some cases, all bits of the volatile counter are maintained by back-up power. In some cases, one or more significant bits are maintained. In some cases, the backup power source may be a capacitor or other similar device. The predetermined length of time may vary depending on the intent of the need for the volatile counter to retain power. For example, the predetermined length of time may be one minute, five minutes, ten minutes, or twenty minutes. In any of these or other cases, the predetermined length of time may be designed to last until a primary power source is expected to return.

In some cases, upon receiving an error event, a bit is written to nonvolatile storage regardless of the value in the volatile counter; and the volatile counter may not be powered by the backup power source for the duration of the error event.

In these scenarios, when a request for a total number of events that have occurred is received, readout circuitry and control logic determines the total number of events by reading the number of bits written to the nonvolatile storage, decoding a nonvolatile value by multiplying the number of events written to the nonvolatile storage by the top volatile count, reading a volatile value from the count of the volatile counter and adding the nonvolatile value to the volatile value. The volatile value used in this determination is a current value at a time of the request for the total number of events. The total number of events is then provided to a source of the request.

In another scenario, upon receiving an error event, the volatile counter is powered by a backup power source at least until a snapshot of the count in the volatile counter is stored in the nonvolatile storage. A snapshot may be a representation of the exact number of events counted in the volatile counter.

In this other scenario, when a request for a total number of events that have occurred is received, readout circuitry and control logic determines the total number of events by determining a nonvolatile value by reading the number of bits written to the nonvolatile storage, decoding an initial nonvolatile value by multiplying the number of events written to the nonvolatile storage by the top volatile count, reading the snapshot of the count stored in the nonvolatile storage, and adding the snapshot of the count stored in the nonvolatile storage to the initial nonvolatile value. The readout circuitry and control logic finishes determining the total number of events by reading a volatile value from the count of the volatile counter representing the current value at a time of the request for the total number of events and then adding the nonvolatile value to the volatile value to generate the total number of events. The readout circuitry and control logic completes the method by providing the total number of events to a source of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques for reliably storing count information efficiently in nonvolatile memory when power loss or other manipulation occurs are described herein. The described methods, techniques, and systems are suitable for maintaining the integrity of the count of certain events when tracking events of interest. During the tracking operation, a loss of power may occur. This loss of power is referred to herein as an "error event." In some cases, the loss of power may be due to an adversarial action. Accordingly, certain methods and systems for tracking events of interest and maintaining a count of those events of interest are described herein.

Events of interest can include, but are not limited to key usage, crypto engine activation, exceptions (e.g., missed/bad connections to a peripheral or other device), privilege activities (e.g., request for special privileges, extension of privileges, revoking of privileges), and missed or bad execution.

In general, when tracking events of interest, a volatile counter increments each time an event of interest is detected. The counter continues to increment until a top volatile count is reached, at which point a single bit of memory is written to nonvolatile storage. When a certain number of events are detected, a suitable response may be implemented. The combination of volatile and nonvolatile storage can help reduce the footprint of mitigation circuitry.

Figure 1A:
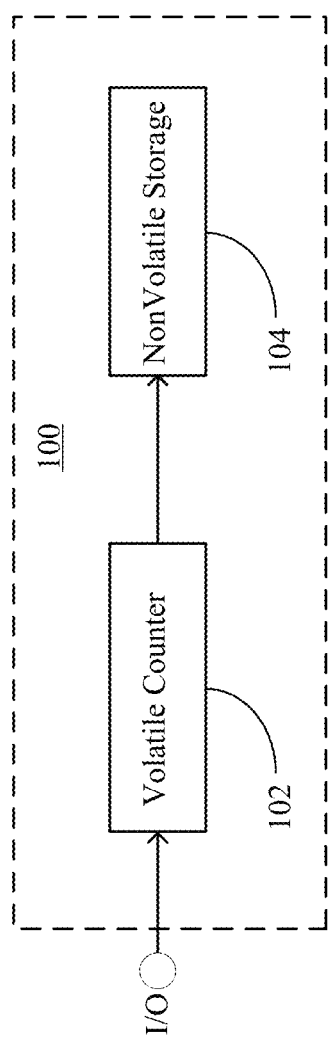
FIG. 1A shows an example implementation of a counting system with a volatile counter and nonvolatile storage.
Figure 1B:
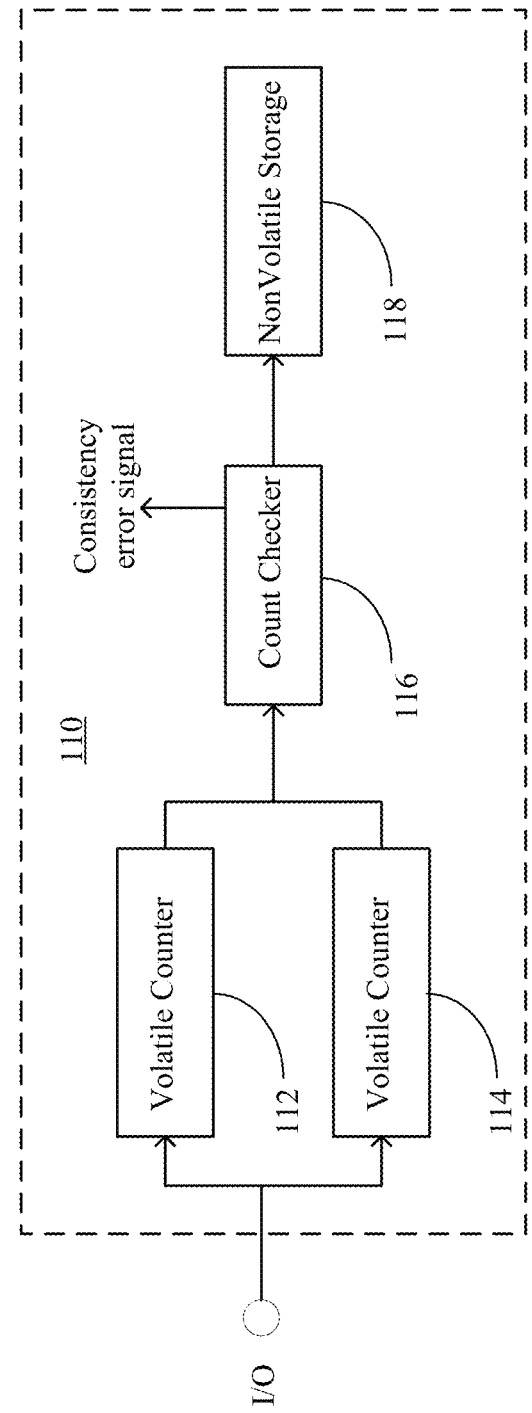
FIG. 1B shows an example implementation of a counting system with two volatile counters, a count checker, and nonvolatile storage.
Figure 1C:
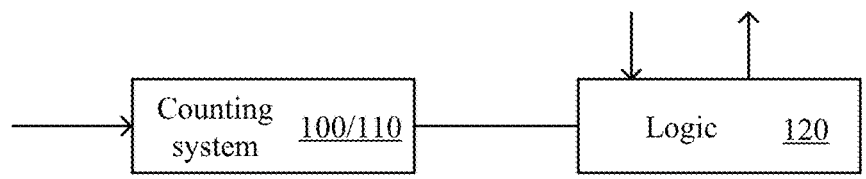
FIG. 1C shows a representative system with a counting system and logic.

FIG. 1A shows an example implementation of a counting system with a volatile counter and nonvolatile storage; FIG. 1B shows an example implementation of a counting system with two volatile counters, a count checker, and nonvolatile storage; and FIG. 1C shows a representative system with a counting system and logic.

Turning to FIG. 1A, a counting system 100 can include a volatile counter 102 and a nonvolatile storage 104. The volatile counter 102 may be implemented for example using flipflops, latches, SRAM, or other volatile memory. The nonvolatile storage 104 may be implemented for example using MRAM, CeRAM or other suitable forms of nonvolatile memory. The volatile counter 102 can be coupled to an I/O (input/output) pin to count (by increments or decrements) an event each time the event is detected. It should be understood that the volatile counter 102 can be coupled to the I/O via other circuitry including, but not limited to, a comparator. Once the count in the volatile counter 102 reaches a top volatile count, a single bit is written in the nonvolatile storage 104. For example, if the top volatile count is one thousand, once the count in the volatile counter 102 reaches one thousand, a single bit is written to the nonvolatile storage 104. The volatile counter 102 may be reset after the count is recorded in the nonvolatile storage 104. In some cases, the system can confirm that the single bit has been written to the nonvolatile storage. In some implementations, the top volatile count is programmable and may be changed, for example, by a user-initiated command, depending on the system requirements.

By utilizing a volatile counter 102, the count does not have to be stored in the nonvolatile storage 104 every time an event is detected. This is useful in situations such as where nonvolatile storage 104 is limited and in situations such as where the nonvolatile storage 104 is one-time programmable (OTP) memory, as examples. Furthermore, by having a single bit in the nonvolatile storage 104 represent a top volatile count (e.g., one thousand), the system can count many more events than otherwise would be possible for the amount of available storage.

Turning to FIG. 1B, a counting system 110 can include redundant volatile counters to support count integrity. For example, a first volatile counter 112 and a second volatile counter 114 can be provided in parallel and receive a same input signal, for example, through being coupled to an I/O (input/output) pin. Each time an event is detected, the first volatile counter 112 increments and the second volatile counter 114 decrements. In some cases, both the first volatile counter 112 and the second volatile counter 114 increment at each detected event. Once the first volatile counter 112 reaches a top volatile count or the second volatile counter 114 reaches a bottom volatile count (or in cases in which the second volatile counter 114 increments, once the second volatile counter 114 reaches the top volatile count), the count checker 116 checks the count of the first volatile counter 112 against the count of the second volatile counter 114 to determine whether the counts of the first and second volatile counters 112, 114 correspond to one another. In some cases, the count checker 116 includes a comparator.

If the counts of the first and second volatile counters 112, 114 do correspond to one another, a single bit is written to the nonvolatile storage 118 that represents the top volatile count. The volatile counters 112, 114 may be reset after the count is recorded in the nonvolatile storage 118. If the counts of the first and second volatile counters 112, 114 do not correspond to one another, a consistency error signal may be provided from the count checker 116 to a countermeasure processor that may initiate a counter measure action or some other restriction to operation. In some cases in which the counts of the first and second volatile counters 112, 114 do not correspond to one another, the occurrence may be considered to be an "error event" and a single bit is be written to the nonvolatile storage 118 that represents the top volatile count. The consistency error signal may be logged as well. For example, the count checker 816 may store an indication that the consistency error signal has been output in a log.

As illustrated in FIG. 1C, readout circuitry and control logic 120 can be coupled to a counting system (e.g., counting system 100 or counting system 110). The readout circuitry and control logic 120 can be configured to control operations of the at least one volatile counter (e.g., counter 102 or one or both of counters 112 and 114), during an error event and determine a total number of events.

During the tracking/counting operations, an error event may occur. For example, the error event may be caused by a loss of power event, which may be an adversarial power loss. In one scenario, upon receiving the error event of the loss of power event, the volatile counter (e.g., volatile counter 102, 112, 114) is powered by a backup power source for a predetermined length of time. In some cases, all bits of the volatile counter are maintained by back-up power. In some cases, one or more significant bits are maintained. In some cases, upon receiving an error event, a bit is written to nonvolatile storage regardless of the value in the volatile counter; and the volatile counter may not be powered by the backup power source for the duration of the error event. In another scenario, upon receiving an error event, the volatile counter is powered by a backup power source at least until a snapshot of the count in the volatile counter is stored in the nonvolatile storage. A snapshot may be a representation of the exact number of events counted in the volatile counter.

Figure 2:
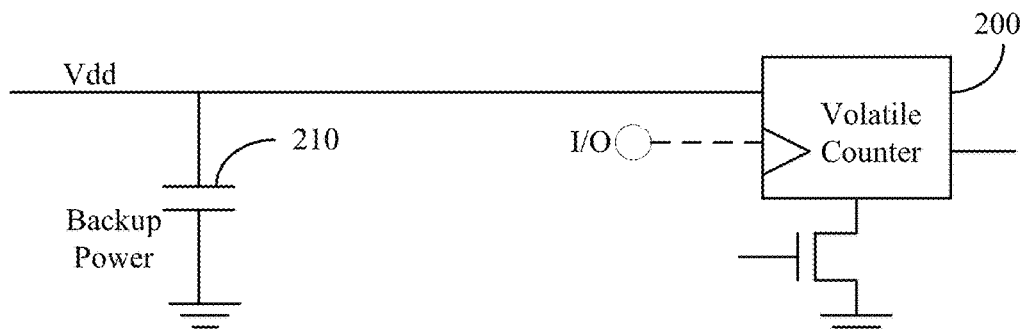
FIG. 2 shows an example implementation of a volatile counter coupled to a backup power source.

FIG. 2 shows an example implementation of a volatile counter coupled to a backup power source.

Referring to FIG. 2, a volatile counter 200, which may be configured as any of volatile counters 102, 112, 114 of FIG. 1A or 1B, can be coupled to a backup power source 210. The backup power source 206 can be a capacitor. The backup power source can also be powered by an alternate power domain. For example, Vdd can supply power to the chip and volatile counter 200 while another power domain such as Vdd2 or a battery voltage Vbat (not shown) can supply power to the backup power supply.

The size/capacitance of the capacitor (or other backup power source 206) can be selected to support holding a voltage level for a predetermined amount of time, for example, a few seconds, one minute, five minutes, ten minutes, or twenty minutes, as examples. In some cases, the predetermined length of time may be designed to last until a primary power source is expected to return. In some cases, the predetermined length of time is an amount of time sufficient to write a single bit to the nonvolatile storage such that in response to an error event, a single bit can be written to the nonvolatile storage. In some cases, the predetermined length of time is an amount of time sufficient to write a snapshot of the count to the nonvolatile storage such that in response to the error event, the snapshot can be written to the nonvolatile storage. In some cases, the predetermined length of time is an amount of time sufficient to maintain at least a significant bit of the count for the volatile counter during a power loss (see e.g., FIGS. 5A and 5B and corresponding description).

Figure 3A:
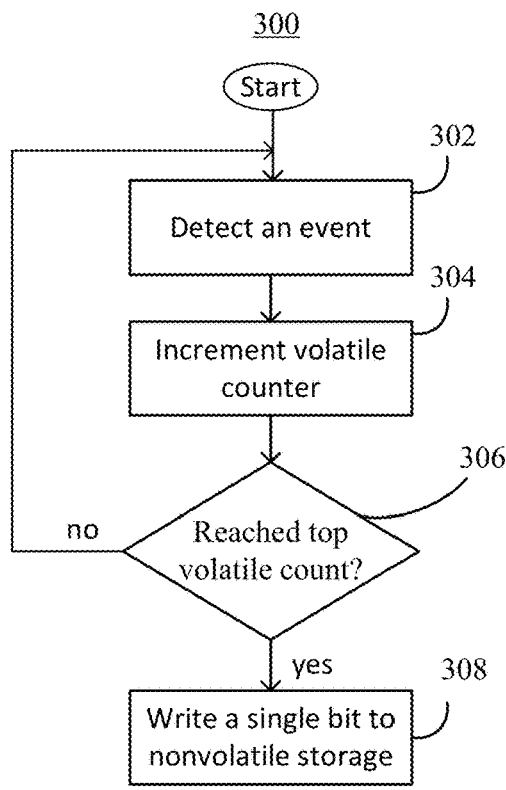
FIGS. 3A and 3B show general operation of counting systems used to track events to of interest.
Figure 3B:
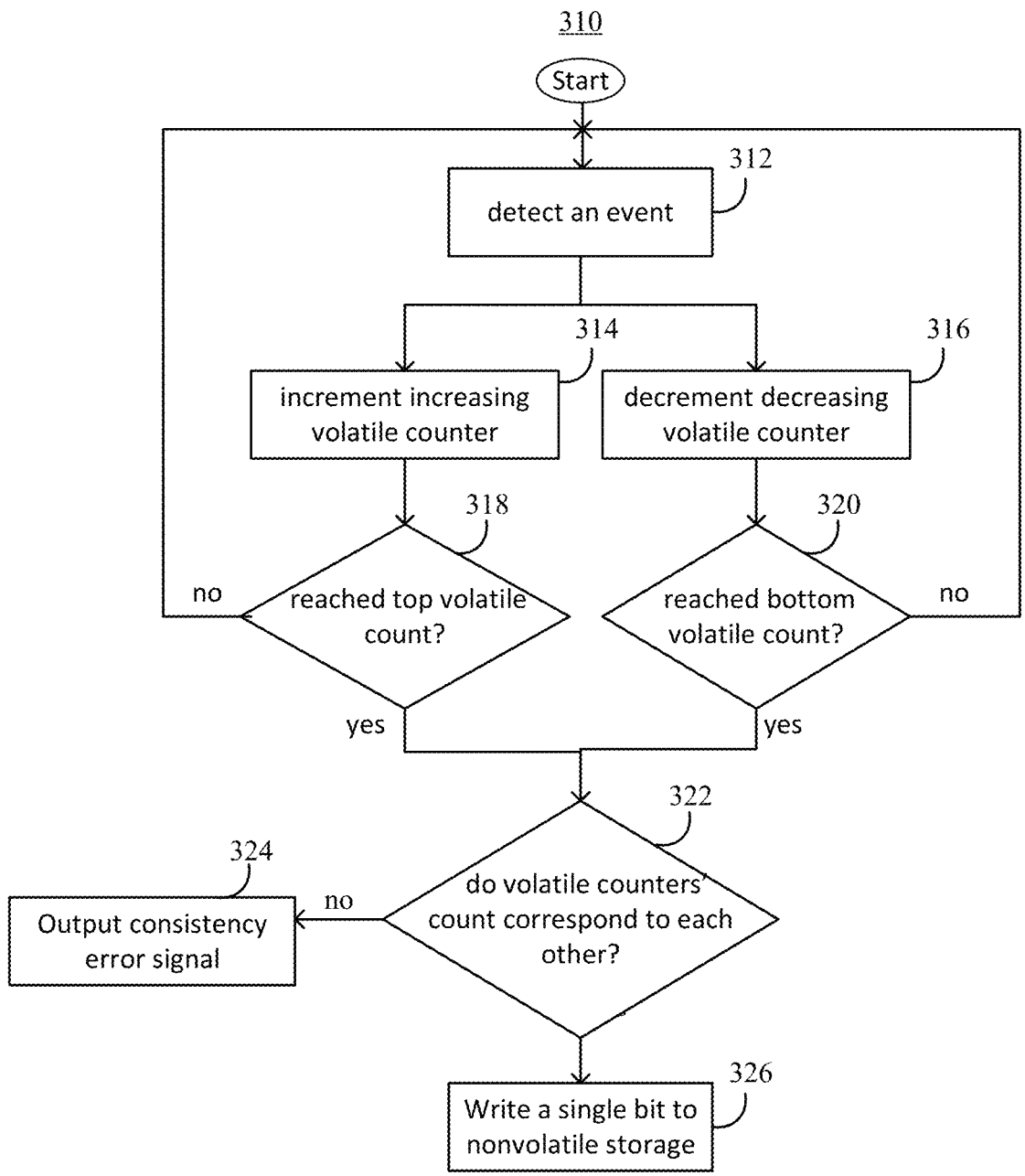

FIGS. 3A and 3B show general operation of counting systems used to track events of interest. FIG. 3A shows a method that may be carried out by counting system 100 of FIG. 1A; and FIG. 3B shows a method that may be carried out by counting system 110 of FIG. 1B. In general, a counting system increments a volatile counter each time an event is detected; and when a count of the volatile counter reaches a top volatile count, a single bit is written to a nonvolatile storage.

Referring to FIG. 3A, events of interest can be tracked by counting system 100 according to process 300 by detecting an event (302). The event may be a reset operation, receipt of a set of data, or any other operation being tracked. When an event is detected, a volatile counter is incremented (304). If a top volatile count has not been reached (306), the method 300 resumes waiting to detect another event. If the top volatile count has been reached (306), a single bit is written to nonvolatile storage (308). The single bit written to the nonvolatile storage represents the top volatile count. In other words, when counting a total number of events, each bit written to nonvolatile storage represents the number of events corresponding to the top volatile count. If the top volatile count represents one thousand events and there are six bits written to nonvolatile storage, the total number of events represented in nonvolatile storage is six thousand (6*1000=6,000).

Referring to FIG. 3B, events can be tracked by counting system 110 according to process 310 by using two volatile counters that each detect the same event (312). The event may be a reset operation, receipt of a set of data, or any other operation being tracked. When an event is detected, an increasing volatile counter is incremented (314) and a decreasing volatile counter is decremented (316). In the illustrated process, one counter increments and the other counter decrements, but in some cases, both counters can increment in response to detecting an event.

Both counters can count a same number of events (which can be referred to as a top volatile count number). Of course, the actual value used to check to see if the top volatile count number of events has occurred may vary. If a top volatile count in the increasing volatile counter is not yet reached (318), the method 310 resumes waiting to detect another event. If a bottom volatile count (the value for the decrementing counter) in the decreasing volatile counter is not reached (320), the method 310 resumes waiting to detect another event. Once either of the two counts have been reached (318, 320) a count checker determines whether the count in the increasing volatile counter and the count in the decreasing volatile counter correspond to each other (322).

If the count in the increasing volatile counter and the count in the decreasing volatile counter do not correspond to each other (322), a consistency error signal can be output (324). In some cases, an indication that the consistency error signal was output can be stored in a log. The consistency error signal can trigger some predetermined action or restriction, for example, a countermeasure action or some other action to protect the integrity of the increasing and decreasing volatile counters and/or determine why the counts in the increasing and decreasing counters do not correspond to one another. If the count in the increasing volatile counter and the count in the decreasing volatile counter do correspond to each other (322), a single bit is written to a nonvolatile storage (326).

For example, if the top volatile count is one hundred and the bottom volatile count is zero and the increasing volatile counter has reached one hundred counts and the decreasing volatile counter has reached zero counts, they will be considered to "correspond" to each other. Similarly, for cases where the count checker checks values of the counters prior to a top (or bottom) volatile count number is reached, assuming the same one hundred counts as the top volatile count and bottom volatile count, if the increasing volatile counter has reached seventy counts and the decreasing volatile counter has reached thirty counts, they will be considered to "correspond" to each other even though the determination of whether the volatile counters' count corresponds to each other (322) would not yet have been reached.

In another scenario, when a user changes the number of the top volatile count, a number of steps must be taken in order to protect the integrity of the total number of events. First, a ratio (R) is computed. R is equal to the new top volatile count (NTVC) divided by the previous top volatile count. Next, the current number of bits used in the nonvolatile storage is divided by R. Any whole number is (at least partially) the new number of bits (NNB) in the nonvolatile storage that will be used. Any remaining decimal (e.g., in cases where the top volatile count is raised) is converted to the new count in the volatile counter. This is accomplished by multiplying the remaining decimal by the NTVC. Any count over the NTVC in the volatile counter (e.g., in cases where the top volatile count is lowered) will be converted to the count in the nonvolatile storage. This is accomplished by multiplying the existing volatile count by the R. Any whole number from this multiplication is added to the NNB in the nonvolatile storage. Any remaining decimal is changed back to the count in the volatile counter by dividing the decimal by R.

Figure 4A:
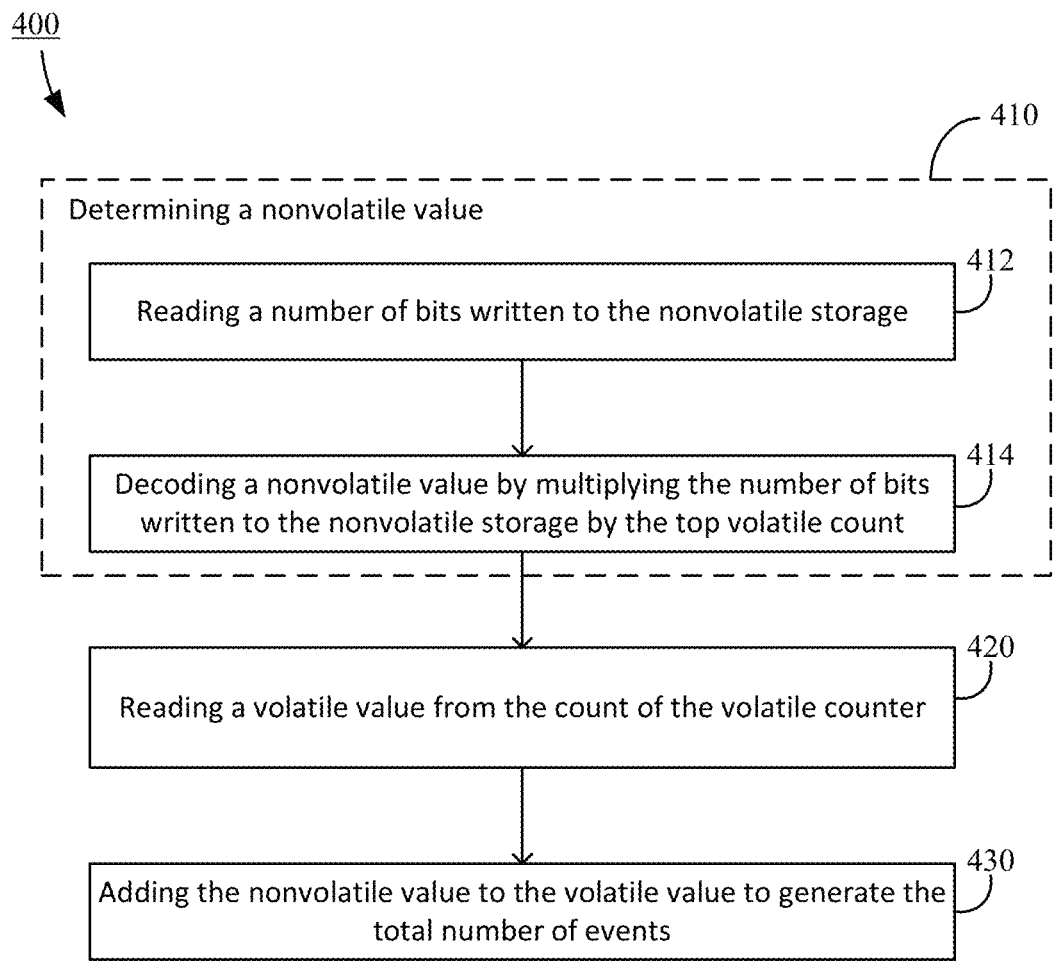
FIGS. 4A and 4B show example methods of tracking events of interest.
Figure 4B:
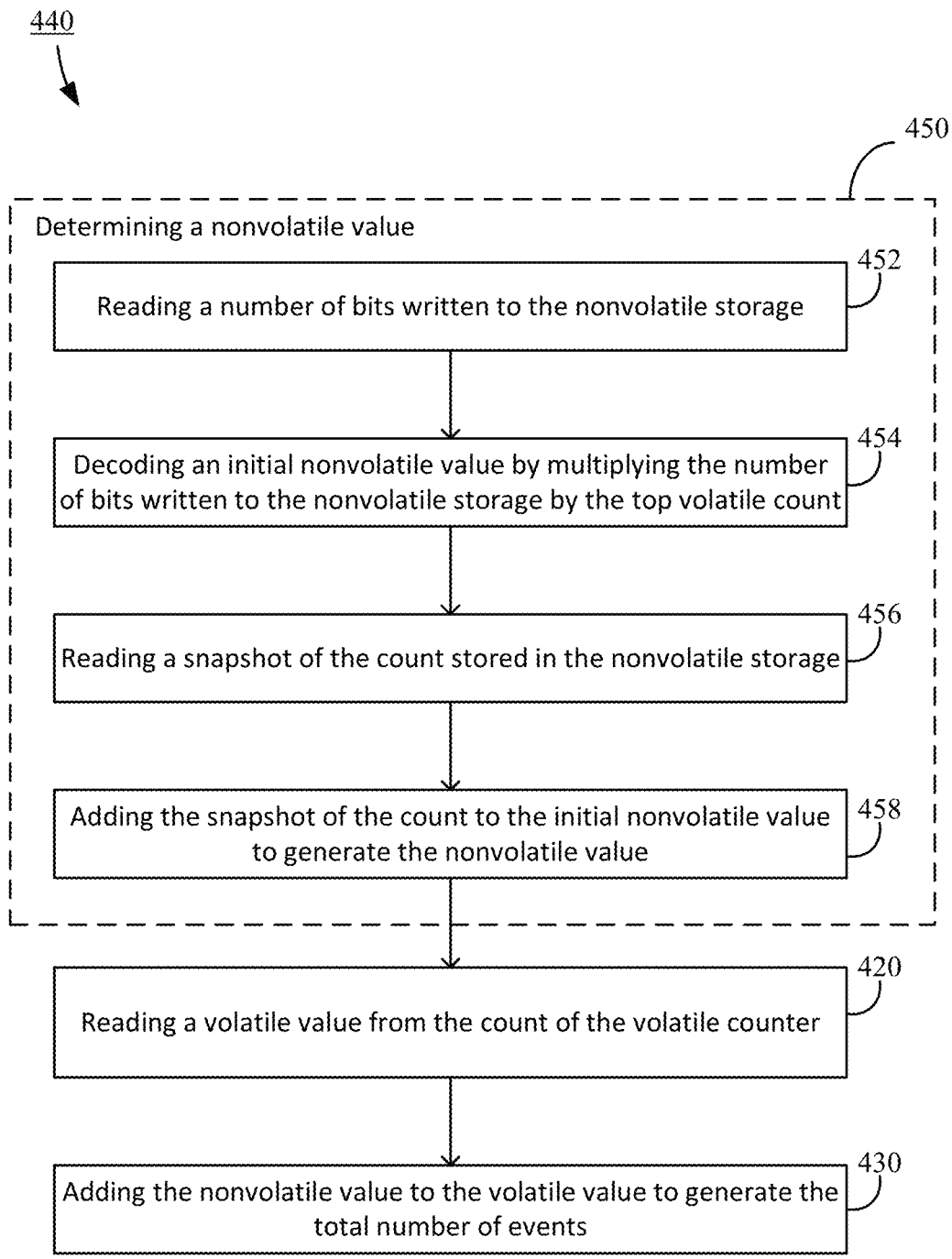

FIGS. 4A and 4B show example methods of tracking events of interest. FIGS. 4A and 4B illustrate two examples of determining a total number of events such that when there is a request for a total number of events (which may be an explicit request or a designed output to a particular destination at particular times or conditions), the total number of events can be provided to a source of the request. As mentioned above, error events may occur during operation of the counting system. The described systems and techniques can adequately track events despite error events including power loss. The specific readout of a total number of events may depend on the particular backup power configuration implemented for the system.

FIG. 4A shows a method that may be carried out by a readout circuitry and control logic for a system in which in response to receiving the error event comprising the loss of power, the volatile counter is powered with a backup power source for a predetermined length of time during the error event. In some of such cases, a bit is written to the nonvolatile storage before the volatile counter loses its count. In other of such cases, the volatile counter is able to maintain at least a significant bit of the count during the power loss duration. In yet other of such cases, the volatile counter is able to maintain its entire count during the time that there is a loss of power and may even continue to increment in response to detecting new events.

As shown in FIG. 4A, method (400) of determining the total number of events that have been counted at a time of a request for the count of the total number of events includes determining (410) a nonvolatile value, reading (420) a volatile value from the count of the volatile counter, and adding (430) the nonvolatile value to the volatile value to generate the total number of events. In the example shown in FIG. 4A, the determining (410) of the nonvolatile value includes reading (412) the number of bits written to the nonvolatile storage, and decoding (414) a nonvolatile value by multiplying the number of events written to the nonvolatile storage by the top volatile count. The volatile value used in this determination is a current value at a time of the request for the total number of events. The total number of events can then be provided to a source of the request.

FIG. 4B shows a method that may be carried out by a readout circuitry and control logic for a system in which in response to receiving the error event comprising the loss of power, the volatile counter is powered with a backup power source for a predetermined length of time during the error event, where the predetermined length of time is an amount of time sufficient to write a snapshot of the count to the nonvolatile storage. As shown in FIG. 4B, method (440) of determining the total number of events that have been counted at a time of a request for the count of the total number of events includes determining (450) a nonvolatile value, reading (420) a volatile value from the count of the volatile counter, and adding (430) the nonvolatile value to the volatile value to generate the total number of events. The volatile value used in this determination is a current value at a time of the request for the total number of events. The total number of events is then provided to a source of the request.

In the example of FIG. 4B, the determining (450) of the nonvolatile value includes some additional steps as compared to the determining (410) of the nonvolatile value in example of FIG. 4A. In particular, in the example shown in FIG. 4B, the determining (450) of the nonvolatile value includes reading (452) a number of bits written to the nonvolatile storage, decoding (454) an initial nonvolatile value by multiplying the number of bits written to the nonvolatile storage by the top volatile count, reading (456) a snapshot of the count stored in the nonvolatile storage, and adding (458) the snapshot of the count to the initial nonvolatile value to generate the nonvolatile value.

The total number of events can trigger counter-measure actions. For example, when the total number of events reaches a predetermined value, initiating a counter-measure action. In some cases, when the total number of bits written to the nonvolatile storage reaches a maximum value, a counter-measure action can be initiated.

Figure 5A:
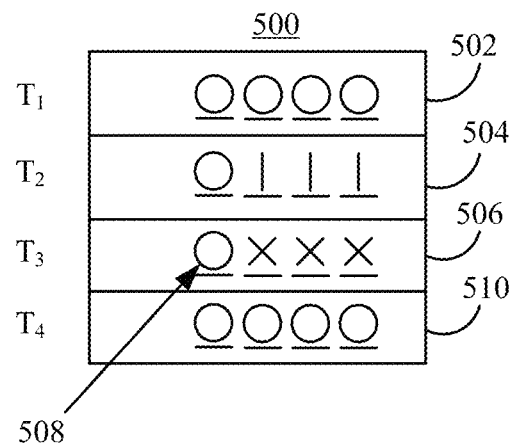
FIG. 5A represents a scenario over time where backup power is provided for a single significant bit during a loss of power event.
Figure 5B:
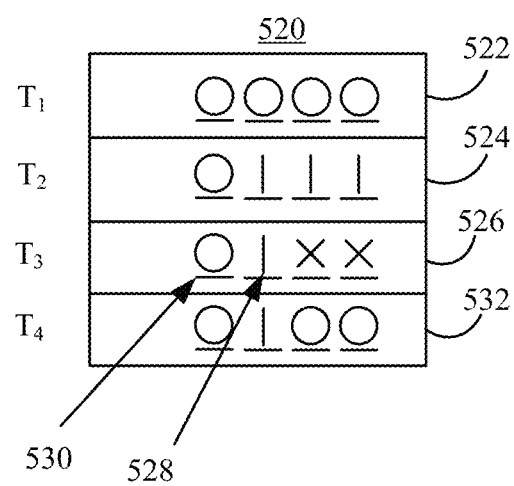
FIG. 5B represents a scenario over time where backup power is provided for two significant bits during a loss of power event.

FIGS. 5A and 5B illustrate example scenarios of a backup power supply providing power to one or more significant bits. FIG. 5A represents a scenario over time where backup power is provided for a single significant bit during a loss of power event. Referring to FIG. 5A, at a first time ($T_1$), the state 502 of the volatile counter 500 ("volatile counter state" 502) is seen having counted no events. This may be the case when counting begins, such as when a volatile counter is first activated or after a top volatile count has been reached but before any more events have been counted. At a second time ($T_2$), the volatile counter state 504 is seen having the value 0, 1, 1, 1. This may represent the count of seven events. In any case, whatever the value of the volatile counter state 504, the value represents the number of events that have been counted in the volatile counter 500 at the point in time.

At a third time ($T_3$), the volatile counter state 506 is seen after having lost power. Here, the backup power is maintaining power to the most significant bit 508. As can be seen, the most significant bit 508 has a value of 0, however, depending on the count at the time of the error event, the most significant bit 508 may have a value of 1. In either case, in this scenario, a backup power supply (not shown) powers only the most significant bit 508, which will allow the most significant bit 508 to be powered for a longer period of time by the same amount of stored charge than would be possible by powering all of the bits in the volatile counter 500. At a fourth time ($T_4$), power has been restored to all of the bits in the volatile counter 500 as shown by volatile counter state 510. As can be seen, the values of the bits that did not maintain power during the loss of power event lost their values, which have returned to 0.

FIG. 5B represents a scenario over time where backup power is provided for two significant bits during a loss of power event. Referring to FIG. 5B, at a first time ($T_1$), the state 522 of the volatile counter 520 ("volatile counter state" 522) is seen having counted no events. This may be the case when counting begins, such as when a volatile counter is first activated or after a top volatile count has been reached but before any more events have been counted. At a second time ($T_2$), the volatile counter 524 is seen having the value 0, 1, 1, 1. This may represent the count of seven events. In any case, whatever the value of the volatile counter state 524, the value represents the number of events that have been counted by the volatile counter 520 at the point in time. At a third time ($T_3$), the volatile counter state 526 is seen after having lost power. Here, the backup power is maintaining power to the most significant bits 528, 530. As can be seen, the most significant bits 528, 530 have values of 0 and 1, respectively. In any case, in this scenario, a backup power supply (not shown) powers only the most significant bits 528, 530, which will allow the most significant bit 528, 530 to be powered for a longer period of time by the same amount of stored charge than would be possible by powering all of the bits in the volatile counter 520. At a fourth time ($T_4$), power has been restored to all of the bits in the volatile counter 520 as shown by the volatile counter state 532. As can be seen, the values of the bits that did not maintain power during the loss of power event lost their values, which have returned to 0.

It should be noted that the more bits that are considered significant (and therefore powered from a finite backup power supply), the shorter the backup power supply can supply power to the most significant bits. When fewer bits that are considered significant (and therefore fewer bits are powered from a finite backup power supply), the longer the backup power supply can supply power to the most significant bits. It should also be noted that, during a power loss event and when using a backup power supply, the voltage in the backup power supply may be monitored and, when reaching certain levels, may only supply power to the most significant bits. In other words, during a power loss event, the backup power supply may initially supply power to all of the bits in a nonvolatile counter. After the power is depleted down to a certain voltage (from supplying all of the bits in the volatile counter), the backup power supply may then supply power to only the most significant bits. In some cases, the backup power supply may supply power to multiple significant bits and, as the power is depleted down to a certain voltage (from supplying all of the most significant bits in the volatile counter), the backup power supply may then supply power to only a portion of the most significant bits. Whatever portion of the most significant bits that would continue to be supplied power from the backup power supply may be predetermined, as is understood by one of ordinary skill in the art.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for tracking events of interest comprising:
   incrementing a volatile counter each time an event is detected;
   when a count of the volatile counter reaches a top volatile count, writing a single bit to a nonvolatile storage;
   receiving an error event comprising a loss of power;
   in response to receiving the error event comprising the loss of power, powering the volatile counter with a backup power source for a predetermined length of time during the error event;
   receiving a request for a total number of events;
   in response to receiving the request for the total number of events, determining, by a readout circuitry and control logic, the total number of events by:
      reading a number of bits written to the nonvolatile storage;
      decoding a nonvolatile value by multiplying the number of bits written to the nonvolatile storage by the top volatile count;
      reading a volatile value from the count of the volatile counter, the volatile value being a current value at a time of the request for the total number of events; and
      adding the nonvolatile value to the volatile value to generate the total number of events; and
   providing the total number of events to a source of the request.

2. The method of claim 1, wherein the predetermined length of time is an amount of time sufficient to write a single bit to the nonvolatile storage;
   wherein in response to the error event, a single bit is written to the nonvolatile storage.

3. The method of claim 1, wherein the predetermined length of time is an amount of time sufficient to maintain at least a most significant bit of the count for the volatile counter during a power loss.

4. The method of claim 3, wherein the backup power source only powers a most significant bit position in the volatile counter.

5. The method of claim 1, wherein the predetermined length of time is an amount of time sufficient to write a snapshot of the count to the nonvolatile storage, wherein in response to the error event, the snapshot is written to the nonvolatile storage, wherein determining the total number of events further comprises reading the snapshot of the count stored in the nonvolatile storage; and
   adding the snapshot of the count to the total number of events before providing the total number of events to the source of the request.

6. The method of claim 1, further comprising decrementing a second volatile counter each time the event is detected; and
   wherein when the count in the volatile counter reaches the top volatile count or when the count in the second volatile counter reaches a bottom volatile count, determining whether the count in the volatile counter corresponds to the count in the second volatile counter before writing the single bit to the nonvolatile storage.

7. The method of claim 1, further comprising incrementing a second volatile counter each time the event is detected.

8. The method of claim 7, wherein when the count in the volatile counter or a count in the second volatile counter reaches the top volatile count, determining whether the count in the volatile counter matches the count in the second volatile counter before writing the single bit to the nonvolatile storage.

9. The method of claim 1, wherein the backup power source comprises a capacitor.

10. The method of claim 1, further comprising when the number of bits written to the nonvolatile storage reaches a maximum value, initiating a counter-measure action.

11. The method of claim 1, further comprising when the total number of events reaches a predetermined value, initiating a counter-measure action.

12. A method for tracking events of interest comprising:
   incrementing a volatile counter each time an event is detected;
   when a count of the volatile counter reaches a top volatile count, writing a single bit to a nonvolatile storage;
   receiving an error event comprising a loss of power;
   in response to receiving the error event comprising the loss of power, powering the volatile counter with a backup power source during the error event at least until a snapshot of the count in the volatile counter is stored in the nonvolatile storage;
   receiving a request for a total number of events;
   in response to receiving the request for the total number of events, determining, by a readout circuitry and control logic, the total number of events by:
      determining a nonvolatile value by:
         reading a number of bits written to the nonvolatile storage;
         decoding an initial nonvolatile value by multiplying the number of bits written to the nonvolatile storage by the top volatile count;
         reading the snapshot of the count stored in the nonvolatile storage; and
         adding the snapshot of the count to the initial nonvolatile value to generate the nonvolatile value;
      reading a volatile value from the count of the volatile counter, the volatile value being a current value at a time of the request for the total number of events; and
      adding the nonvolatile value to the volatile value to generate the total number of events; and
   providing the total number of events to a source of the request.

13. A system for tracking events of interest comprising:
   a volatile counter;
   a nonvolatile storage coupled to the volatile counter, the nonvolatile storage storing a bit for each top volatile count number of events identified by the volatile counter;
   a backup power source coupled to the volatile counter; and
   readout circuitry and control logic coupled to the volatile counter and to the nonvolatile storage, the readout circuitry and control logic being configured to control operations of the volatile counter during an error event and determine a total number of events, wherein the backup power source supports operation of the volatile counter for a predetermined length of time during the error event, wherein the readout circuitry and control logic is further configured to:

in response to receiving a request for the total number of events, determine the total number of events by:

reading a number of bits written to the nonvolatile storage;

decoding a nonvolatile value by multiplying a number of bits written to the nonvolatile storage by a top volatile count;

reading a volatile value from a count of the volatile counter, the volatile value being a current value at a time of the request for the total number of events; and adding the nonvolatile value to the volatile value to generate the total number of events; and provide the total number of events to a source of the request.

14. The system of claim 13, wherein the predetermined length of time is an amount of time sufficient to write a single bit to the nonvolatile storage; wherein in response to the error event, a single bit is written to the nonvolatile storage.

15. The system of claim 13, wherein the predetermined length of time is an amount of time sufficient to maintain at least a most significant bit of the count for the volatile counter during a power loss.

16. The system of claim 13, wherein the backup power source comprises a capacitor coupled to at least a most significant bit position of the volatile counter.

17. The system of claim 13, further comprising:

a second volatile counter coupled in parallel to the volatile counter, wherein the volatile counter increments in response to receiving an event and the second volatile counter decrements in response to receiving the event, wherein the volatile counter that increments in response to receiving the event increments to the top volatile count and the second volatile counter that decrements in response to receiving the event decrements to a bottom volatile count, wherein the bottom volatile count is a value corresponding to the top volatile count number of events from a starting count value of the second volatile counter that decrements in response to receiving the event; and a count checker, wherein the count checker outputs a consistency error signal when one of the two counters indicates the top volatile count number of events has occurred while the other of the two does not.

18. The system of claim 13, further comprising:

a second volatile counter coupled in parallel to the volatile counter, wherein both the volatile counter and the second volatile counter increment in response to receiving an event; and a count checker, wherein the count checker outputs a consistency error signal when one of the two counters indicates the top volatile count number of events has occurred while the other of the two does not.

19. A system for tracking events of interest comprising:

a volatile counter;

a nonvolatile storage coupled to the volatile counter, the nonvolatile storage storing a bit for each top volatile count number of events identified by the volatile counter;

a backup power source coupled to the volatile counter; and readout circuitry and control logic coupled to the volatile counter and to the nonvolatile storage, the readout circuitry and control logic being configured to control operations of the volatile counter during an error event and determine a total number of events, wherein the backup power source supports operation of the volatile counter at least until a snapshot of a count in the volatile counter is stored in the nonvolatile storage during the error event, wherein the readout circuitry and control logic is further configured to:

in response to receiving a request for the total number of events, determine the total number of events by:

determining a nonvolatile value by:

reading a number of bits written to the nonvolatile storage;

decoding an initial nonvolatile value by multiplying the number of bits written to the nonvolatile storage by a top volatile count;

reading the snapshot of the count stored in the nonvolatile storage; and adding the snapshot of the count to the initial nonvolatile value to generate the nonvolatile value;

reading a volatile value from a count of the volatile counter, the volatile value being a current value at a time of the request for the total number of events; and adding the nonvolatile value to the volatile value to generate the total number of events; and provide the total number of events to a source of the request.

* * * * *